(No Model.)

P. J. SCHREIBER.
SPECTACLE FRAME.

No. 440,064. Patented Nov. 4, 1890.

Witnesses
Albert Speider.
W. Hunter Myers.

Inventor
Philip J. Schreiber
By Attorney
Phil. T. South

UNITED STATES PATENT OFFICE.

PHILIP J. SCHREIBER, OF DAYTON, OHIO.

SPECTACLE-FRAME.

SPECIFICATION forming part of Letters Patent No. 440,064, dated November 4, 1890.

Application filed April 2, 1890. Serial No. 346,361. (No model.)

*To all whom it may concern:*

Be it known that I, PHILIP J. SCHREIBER, a citizen of the United States, residing at Dayton, in the county of Montgomery and State of Ohio, have invented a new and useful (new article of manufacture) Nose-Piece for Spectacle-Frames, of which the following is a specification.

My invention relates to improvements in the manufacture of spectacle-frames; and it consists of an independent adjustable nose-piece as a new article of manufacture and in combination with a spectacle-frame.

The object of my invention is to provide a nose piece or bridge for spectacle-frames, which may be easily attached to or detached from any ordinary spectacle-frame, and may be so adjusted at any angle as to fit itself to any shape of nose. I attain these objects by means of the mechanism illustrated in the accompanying drawings, in which—

Figure 1:
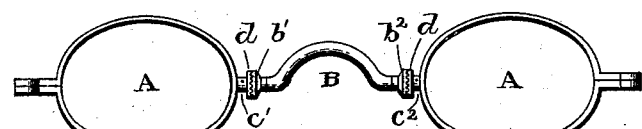
Figures 2, 3:
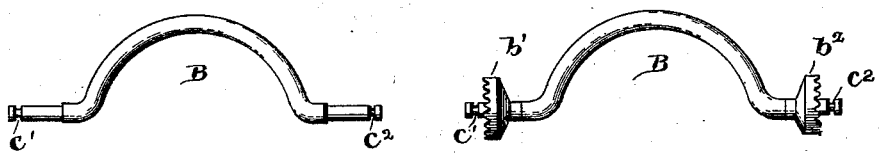
Figure 4:
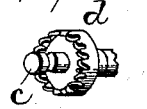
Figure 5:
Figure 6:
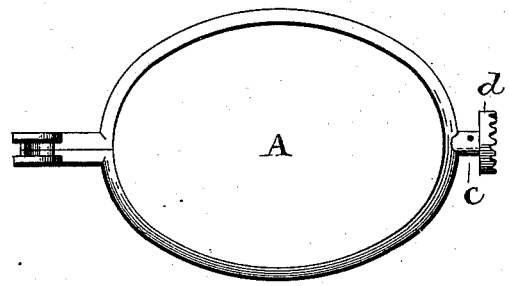

Figure 1 is a spectacle-frame complete, showing the application of my device. Fig. 2 is the nose-piece without the toothed ring. Fig. 3 is the nose-piece with the toothed ring attached. Fig. 4 is the toothed ring detached. Fig. 5 is the toothed socket detached. Fig. 6 is the toothed socket made fast to a spectacle-frame.

Similar letters refer to similar parts throughout the several views.

In the drawings, Fig. 2, B is the nose-piece, the ends provided with grooves $c'$ $c^2$.

In Fig. 6, $d$ is a toothed ring, which is made fast to the ends of the nose-piece just back of the grooves, as shown in Fig. 3 at $b'$ $b^2$. Fig. 5 is a toothed socket $d$ with stem provided with pin or screw hole. This socket is made fast by soldering to the frame A, as shown in Fig. 4.

In the manufacture of spectacles one of the greatest obstacles to overcome is fitting the frames to the nose after suitable glasses have been selected or provided. This objection is not infrequently a very difficult thing to do and sales sometimes lost because of no ready means at hand to make the necessary alterations. I overcome all these objections in my device by providing a nose-piece separate and independent of the other parts of a frame, and which is so arranged and provided with toothed ring and socket that a suitable nose-piece in size, height, and width can easily be selected and fitted. The teeth upon the nose-piece and socket-seat are so arranged that the nose-piece can be adjusted to any angle to accommodate the nose-bridge. When the whole has been properly adjusted, the ends of the nose-piece are made fast within the socket by means of a pin or screw passed through a hole in the socket-stem which engages the grooves $c'$ $c^2$, securely holding the nose-piece fast to the eye-frame A, as shown in Fig. 1.

Having thus described my invention, what I claim as new, and desire to secure by Letters Patent, is—

1. An independent adjustable nose-piece provided with grooves $c'$ $c^2$, with its attachments, toothed ring $b$ $b$, and toothed socket $d'$ $d^2$, as a new article of manufacture, substantially as and for the purpose set forth.

2. An independent adjustable nose-piece provided with grooves $c'$ $c^2$, cut-toothed rings $b'$ $b^2$, and sockets $d'$ $d^2$, in combination with frame A, substantially as and for the purpose set forth and described.

PHILIP J. SCHREIBER.

Attest:
B. F. HERSHEY,
R. H. DICKS.